Patented Aug. 28, 1945

2,383,540

UNITED STATES PATENT OFFICE 2,383,540

OIL RESISTING RUBBER

Geoffrey Gee and Stanley Charles Stokes, Welwyn Garden City, England, assignors to The British Rubber Producers' Research Association, London, England, a body corporate of Great Britain No Drawing. Application December 19, 1942, Serial No. 469,564. In Great Britain September 24, 1941

1 Claim. (Cl. 260—727.)

This invention relates to hydrohalogenated rubbers with more especial reference to the preparation of rubber hydrochloride which when compounded and vulcanised gives products highly resistant to mineral oils and suitable for use as petrol or oil hose, refueling hose, engine covers, washers, or generally in contact with mineral oils.

According to the present invention a process of preparing rubber hydrochloride consists in reacting rubber dissolved in benzene, chloroform or other suitable organic solvent with sufficient hydrochloric acid gas, preferably while excluding oxygen, to give an unsaturated rubber hydrochloride having a chlorine content exceeding 20% by weight and isolating the product by steam distillation or by precipitation from the solution.

Preferably, the rubber—which may be crepe—is softened by milling prior to solution whereby higher concentrations may be dissolved and preferably also the reaction mixture is cooled to below 20° C., the proportion of gaseous hydrochloride acid being such as to give the rubber hydrochloride a chlorine content of 25–26%, it having been found that modified rubbers within this range when compounded and cured provide products of high oil resistance and having properties of strength and flexibility rendering them eminently suitable for employment as washers, petrol hose and generally in contact with mineral oils.

With lower chlorine contents the tensile figures are poor. Processing becomes increasingly difficult with higher chlorine contents, and the vulcanised products become harder and less elastic, particularly at low temperatures.

For compounding the rubber hydrochloride the usual rubber technique may be followed, but zinc oxide should only be present in proportions below 1% on the rubber hydrochloride and the curing temperature should not substantially exceed 100° C. to remove any likelihood of dissociation. Pigments, fillers, anti-oxidants and accelerators may be included in the mix and stabilisers such as triethanolamine or hexamine may with advantage be present to remove any hydrochloric acid evolved during the cure or subsequently.

Elasticity is improved by the incorporation of a low viscosity straight chain hydrocarbon which may or may not contain a proportion of aromatic compounds, (e. g., commercial kerosine), and the addition of kerosine also aids calendering and extruding. For frictioning, softeners such as pine tar can be added with advantage.

The following is a specific example of the practice of the invention:

100 gms. of pale crepe rubber is milled on water cooled rolls to give a product having a plasticity as measured by the Mooney plastometer of 50.

The milled crepe is agitated with 1550 ccs. of benzene until the mixture is a solution.

The solution is cooled to about 150° C., and 41 gms. of dry, air free hydrochloric acid is passed into it, at a rate of 1.5 gms. per minute, the mass being agitated during the process.

The reaction mixture is allowed to stand for three days at atmospheric pressure, and the product is recovered by running the solution in a thin stream into boiling water through which a current of steam is passed. The separated mass is washed and air dried, the resulting material having a chlorine content of 25.5%.

Alternatively the rubber hydrochloride may be isolated by steam distillation or by precipitation from the solution with petrol ether or alcohol or by neutralising the reaction mixture with excess sodium carbonate and precipitating the product with alcohol.

The rubber hydrochloride is then compounded on a rubber mill, according to the usual practice of rubber milling and the following mixture prepared:

| | Parts by weight |
|---|---|
| Rubber hydrochloride | 100 |
| Sulphur | 3 |
| Zinc oxide | 1 |
| China clay | 40 |
| Nonox | 2 |
| T. M. T.[1] | 1 |
| Triethanolamine | 5 |
| Kerosene | 20 |

[1] T. M. T. is an abbreviation for tetra methyl thiuram disulphide.

The compounded material is vulcanised in a mould for 2 hours @ 100° C., to produce a vulcanisate with a breaking load of 1410 gms. per sq. mm. and an elongation at break of 515%. After immersing in aviation fuel for 3 days the weight of the test sample is increased by 37% with a volume increase of 70% and a breaking load of 267 gms. per sq. mm. and an elongation of 199% is recorded.

A pale crepe control mixture compounded as above, but omitting the triethanolamine and the kerosene, and vulcanised for 2 hours at 100° C. gives a breaking load of 1920 gms. per sq. mm. with an elongation of 630%. After immersion in aviation fuel for 3 days the following figures are recorded:

| | |
|---|---|
| Increase in weight _____per cent__ | 166 |
| Increase in volume _____do____ | 247 |
| Breaking load _____gms. per sq. mm__ | 189 |
| Elongation _____per cent__ | 290 |

Vulcanisates prepared according to the invention retain their advantageous characteristics of oil resistance, strength and flexibility even after exposure to air at moderately elevated temperatures over prolonged periods, thereby rendering them particularly suitable for use as petrol hose, washers and the like in connection with the fuel systems of internal combustion engines.

What we claim is:

A process for the preparation of oil-resisting rubbers consisting in dissolving crepe rubber in a suitable organic solvent, subjecting said solution to a predetermined flow of hydrochloric acid gas, while agitating the solution, to thereby convert a portion of said solution into an unsaturated rubber hydrochloride having a chlorine content of approximately 26% by weight, isolating said rubber hydrochloride from said solution, compounding said rubber hydrochloride with normal compounding ingredients including less than 1% of zinc oxide by weight of said rubber hydrochloride, and finally vulcanizing said compound at a temperature not in excess of 100° C.

GEOFFREY GEE.
STANLEY CHARLES STOKES.